United States Patent
Bromley et al.

(10) Patent No.: US 7,433,741 B2
(45) Date of Patent: Oct. 7, 2008

(54) HYBRID USER INTERFACE HAVING BASE PRESENTATION INFORMATION WITH VARIABLY PROMINENT SUPPLEMENTAL INFORMATION

(75) Inventors: Clifton H. Bromley, New Westminster (CA); Kevin G. Gordon, Annacis Island Delta (CA); Eric G. Dorgelo, Port Moody (CA); Shafin A. Virji, Vancouver (CA); Marc D. Semkow, Burnaby (CA); Douglas J. Reichard, Fairview, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 205 days.

(21) Appl. No.: 11/239,899

(22) Filed: Sep. 30, 2005

(65) Prior Publication Data

US 2007/0078526 A1  Apr. 5, 2007

(51) Int. Cl.
  *G05B 11/01*   (2006.01)
  *G05B 15/00*   (2006.01)
(52) U.S. Cl. .......................... 700/17; 700/83
(58) Field of Classification Search .............. 700/86, 700/18, 23, 12, 9, 253, 27, 81, 79
  See application file for complete search history.

(56) References Cited

U.S. PATENT DOCUMENTS

| | | | | |
|---|---|---|---|---|
| 4,370,706 A | * | 1/1983 | Doniger et al. | ............... 700/79 |
| 5,119,079 A | * | 6/1992 | Hube et al. | ................. 715/823 |
| 5,369,566 A | * | 11/1994 | Pfost et al. | ..................... 700/18 |
| 5,675,752 A | * | 10/1997 | Scott et al. | ................. 715/866 |
| 5,890,175 A | * | 3/1999 | Wong et al. | .................. 715/505 |
| 6,134,102 A | * | 10/2000 | Worn et al. | .................. 361/680 |
| 6,421,571 B1 | * | 7/2002 | Spriggs et al. | ................ 700/17 |
| 6,559,860 B1 | | 5/2003 | Hamilton et al. | |
| 6,594,588 B1 | * | 7/2003 | Peden et al. | ................... 702/32 |
| 6,618,852 B1 | * | 9/2003 | van Eikeren et al. | ........ 717/108 |
| 6,816,754 B2 | * | 11/2004 | Mukai et al. | ................ 700/245 |
| 6,931,288 B1 | * | 8/2005 | Lee et al. | ....................... 700/86 |
| 6,993,723 B1 | | 1/2006 | Danielsen et al. | |
| 7,085,773 B2 | * | 8/2006 | Dorsett, Jr. | ............... 707/104.1 |
| 2001/0056405 A1 | | 12/2001 | Myres et al. | |
| 2002/0120519 A1 | | 8/2002 | Martin et al. | |
| 2003/0120472 A1 | | 6/2003 | Lind | |
| 2003/0193481 A1 | | 10/2003 | Sokolsky | |
| 2004/0153371 A1 | | 8/2004 | Razumov | |
| 2004/0212626 A1 | | 10/2004 | Lyxzen et al. | |
| 2005/0090911 A1 | | 4/2005 | Ingargiola et al. | |
| 2005/0179650 A1 | | 8/2005 | Ludwig | |

* cited by examiner

*Primary Examiner*—Thomas K. Pham
(74) *Attorney, Agent, or Firm*—Amin Turocy & Calvin LLP; Alexander R. Kuszewski

(57) ABSTRACT

Systems and methods are provided that enable various interface applications that more efficiently communicate data to users in an industrial control system. In one aspect, an industrial automation system is provided. The system includes a base presentation component to display one or more elements of an industrial control environment. Various display items can be dynamically superimposed on the base presentation component to provide industrial control information to a user. In another aspect of the industrial automation system, a location component is provided to identify a physical or a virtual location for a user in an industrial control environment. This can include a context component to determine at least one attribute for the user in view of the physical or virtual location. A presentation component then provides information to the user based in part on the physical or virtual location and the determined attribute.

28 Claims, 9 Drawing Sheets

HYBRID USER INTERFACE HAVING BASE PRESENTATION INFORMATION WITH VARIABLY PROMINENT SUPPLEMENTAL INFORMATION

TECHNICAL FIELD

The subject invention relates generally to industrial control systems, and more particularly to various automated interfaces that interact with industrial control systems based in part on detected factors such as a user's role, identity, location, and so forth.

BACKGROUND

Industrial controllers are special-purpose computers utilized for controlling industrial processes, manufacturing equipment, and other factory automation, such as data collection or networked systems. At the core of the industrial control system, is a logic processor such as a Programmable Logic Controller (PLC) or PC-based controller. Programmable Logic Controllers for instance, are programmed by systems designers to operate manufacturing processes via user-designed logic programs or user programs. The user programs are stored in memory and generally executed by the PLC in a sequential manner although instruction jumping, looping and interrupt routines, for example, are also common. Associated with the user program are a plurality of memory elements or variables that provide dynamics to PLC operations and programs. Differences in PLCs are typically dependent on the number of Input/Output (I/O) they can process, amount of memory, number and type of instructions, and speed of the PLC central processing unit (CPU).

One area that has grown in recent years is the need for humans to interact with industrial control systems in the course of business operations. This includes employment of human machine interfaces (HMI) to facilitate operations with such systems, where the HMI can be provided as a graphical user interface in one form. Traditional HMI/automation control systems are generally limited in their ability to make users aware of situations that require their attention or of information that may be of interest to them relative to their current tasks. Where such mechanisms do exist, they tend to be either overly intrusive (e.g., interrupting the user's current activity by "popping up" an alarm display on top of whatever they were currently looking at) or not informative enough (e.g., indicating that something requires the user's attention but not providing information about what). Often times, the user must navigate to another display (e.g., a "detail screen", "alarm summary" or "help screen") to determine the nature of the information or even to determine whether such information exists. As can be appreciated, navigation and dealing with pop-ups is time consuming and costly.

In other conventional HMI/automation control systems, information that is presented to users must be preconfigured by a control system designer and must be explicitly requested the user. For example, when an alarm condition occurs and the user wants additional information to help them diagnose/resolve the issue, they must explicitly ask the system to provide it. For this to occur, several conditions should be true: (1) when the control system was designed, the designer must have thought to make that specific information available to that user/role and for that specific situation; (2) the user must know that such information exists; and (3) the user must ask the system to fetch and display that information.

SUMMARY

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

Various interface applications are provided to facilitate more efficient interactions with industrial automation systems. In one aspect, systems and methods are provided to mitigate navigation issues with human machine interfaces (HMI) and/or pop-up problems associated with such interfaces. By exploiting situation-specific data or "information of interest", e.g., based on factors such as the user's identity, role, location (logical or physical), current task, current view, and so forth, an HMI can be provided to superimpose such situation-specific information upon the user's current view of the automation control system ("base presentation") in a manner that communicates the essence of information as well as its importance/priority/urgency without completely dominating the user's attention or interrupting their current interaction with the system. In this manner, problems dealing with excessive navigation or obtrusive displays can be mitigated.

In another aspect, systems and methods are provided for mitigating pre-configuration interface issues by automatically providing users with relevant, situation-specific information. This includes automatically locating information that may be of interest/use in a user's current situation by matching attributes such as the user's identity, role, location (logical or physical), current activity, similar previous (historical) situations/activities, and so forth with other data such as device/equipment locations, device/equipment status, user/role/situation-specific reports, user-documentation, training manuals, and so forth. Thus, the user is automatically provided a rich set of information related to their current task/situation without generally requiring that person/situation/information mappings be predefined by control system designers.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

Systems and methods are provided that enable various interface applications that more efficiently communicate data to users in an industrial control system. In one aspect, an industrial automation system is provided. The system includes a base presentation component to display one or more elements of an industrial control environment. Various display items can be dynamically superimposed on the base presentation component to provide industrial control information to a user. In another aspect of the industrial automation system, a location component is provided to identify a physical or a virtual location for a user in an industrial control environment. This can include a context component to determine at least one attribute for the user in view of the physical or virtual location. A presentation component then provides information to the user based in part on the physical or virtual location and the determined attribute.

It is noted that as used in this application, terms such as "component," "display," "interface," and the like are intended to refer to a computer-related entity, either hardware, a combination of hardware and software, software, or software in execution as applied to an automation system for industrial control. For example, a component may be, but is not limited to being, a process running on a processor, a processor, an object, an executable, a thread of execution, a program and a computer. By way of illustration, both an application running on a server and the server can be components. One or more components may reside within a process and/or thread of execution and a component may be localized on one computer and/or distributed between two or more computers, industrial controllers, and/or modules communicating therewith.

Figure 1:
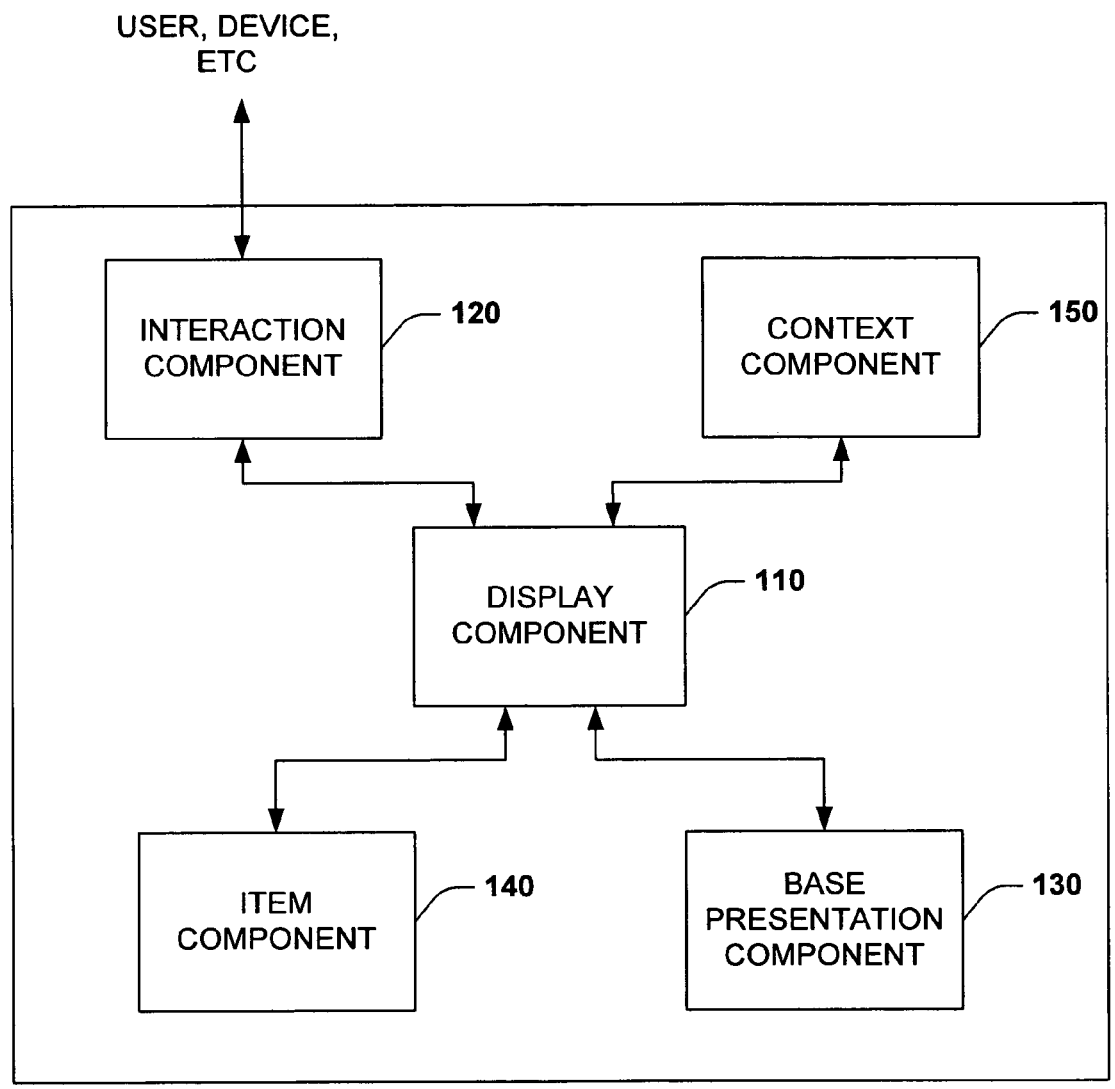
FIG. 1 is a schematic block diagram illustrating a graphical user interface system.

Referring initially to FIG. 1, a graphical user interface system 100 is depicted for an industrial automation environment. It is contemplated that interface system 100 can form at least part of a human machine interface (HMI), but is not limited thereto. For example, the interface system 100 can be employed to facilitate viewing and interaction with data related to automation control systems, devices, and/or associated equipment (collectively referred to herein as an automation device(s)) forming part of a production environment. Interface system 100 includes a display component 110, interaction component 120, base presentation component 130, item component 140, and context component 150.

The display component 110 can render a display to and/or receive data from a display device or component such as a monitor, television, computer, mobile device, web browser or the like. In particular, automation devices and information or data concerning automation devices can be presented graphically in an easily comprehensible manner. The data can be presented as one or more of alphanumeric characters, graphics, animations, audio and video. Furthermore, the data can be static or updated dynamically to provide information in real-time as changes or events occur. Still further yet, one can interact with the interface 100 via the interaction component 120.

The interaction component 120 is communicatively coupled to the display component 110 and receives input concerning the displayed objects and information. Interaction component 120 can receive input from a user, where user input can correspond to object identification, selection and/or interaction therewith. Various identification mechanisms can be employed. For example, user input can be based on positioning and/or clicking of a mouse, stylus, or trackball, and/or depression of keys on a keyboard or keypad with respect to displayed information. Furthermore, the display device may be by a touch screen device such that identification can be made based on touching a graphical object. Other input devices are also contemplated including but not limited to gesture detection mechanisms (e.g., pointing, gazing . . .) and voice recognition.

In addition to object or information selection, input can correspond to entry or modification of data. Such input can affect the display and/or automation devices. For instance, a user could alter the display format, color or the like. Additionally or alternatively, a user could modify automation device parameters. By way of example and not limitation, a conveyor motor speed could be increased, decreased or halted. It should be noted that input need not come solely from a user, it can also be provided by automation devices. For example, warnings, alarms, and maintenance schedule information, among other things, can be provided with respect to displayed devices.

The display component 110 is also communicatively coupled to base presentation component 130 and item component 140. Base presentation component 130 generates, receives, retrieves or otherwise obtains a graphical representation of a production environment including one or more objects representing, inter alia, devices, information pertaining to devices (e.g., gages, thermometers . . .) and the presentation itself. In accordance with one aspect, the base presentation provided by base presentation component 130 can form all or part of the complete display rendered by the display component 110. In addition to the base presentation, one or more items can form part of the display.

An item is a graphical element or object that is superimposed on at least part of the base presentation or outside the boundaries of the base presentation. The item can provide information of interest and can correspond to an icon, a thumbnail, a dialog box, a tool tip, and a widget, among other things. The items can be transparent, translucent, or opaque be of various sizes, color, brightness, and so forth as well as be animated for example fading in and out. Icons items can be utilized to communicate the type of information being presented. Thumbnails can be employed to present an overview of information or essential content. Thumbnails as well as other items can be a miniature but legible representation of information being presented and can be static or dynamically updating. Effects such as fade in and out can be used to add or remove superimposed information without overly distracting a user's attention. In addition, items can gradually become larger/smaller, brighter/dimmer, more/less opaque or change color or position to attract more or less of a user's attention, thereby indicating increasing or decreasing importance of the information provided thereby. The positions of the items can also be used to convey one or more of locations of equipment relative to a user's current location or view, the position or index of a current task within a sequence of tasks, the ability to navigate forward or back to a previously visited presentation or view and the like. The user can also execute some measure of control over the use/meaning of these various presentation techniques, for example via interface component 120.

If desired, a user can choose, via a variety of selection methods or mechanisms (e.g., clicking, hovering, pointing . . .), to direct their attention to one or more items. In this case the selected information, or item providing such information, can become prominent within the presentation, allowing the user to view and interact with it in full detail. In some cases, the information may change from static to active/dynamically updating upon selection. When the focus of the presentation changes in such a manner, different information may become more/less interesting or may no longer be of interest at all. Thus, both the base presentation and the set of one or more items providing interesting information can be updated when a user selects a new view.

Figure 2:
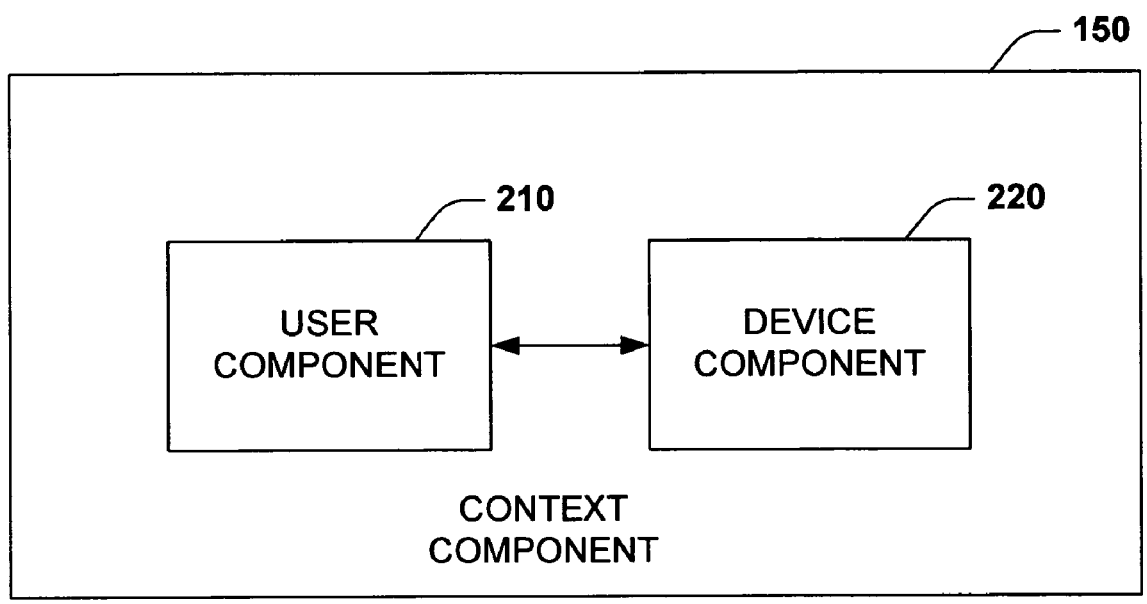
FIG. 2 is a schematic block diagram illustrating a context component for a graphical user interface system.

The items and base presentation provided for display can be affected by context. Context information is provided by context component 150, which is communicatively coupled to display component 110. Turning briefly to FIG. 2 a context component 150 is illustrated in further detail. The context component 150 can include a user component 210 and a device component 220. The user component 150 can detect or determine context information regarding a user or users. Such information can include but is not limited to a user's identity, role, location (logical or physical), current activity, similar or previous interactions with automation devices. Similarly, device component 220 detects or determines context data pertaining to automation devices including control systems, devices and associated equipment. Device context data can include but is not limited to logical/physical locations and operating status (e.g., on/off, healthy/faulty . . . ). Returning to FIG. 1, the context component 130 can provide the determined, detected or otherwise acquired context data to display component 110. Display component can then utilize such data in determining which base presentations and or items to display as well as their format and position.

By way of example, as a user navigates through interface system 100 (physically or virtually), the system 100 can determine and track their identity, their roles and responsibilities, their areas or regions of interest/responsibility and their activities. Similarly, the system can maintain information about devices/equipment that make up the automation control system, information such as logical/physical locations, operating status and the types of information that are of interest to different persons/roles. The system is then able to create mappings/linkages between these two sets of information and thus identify information germane to a user's current location and activities, among other things.

Figure 3:
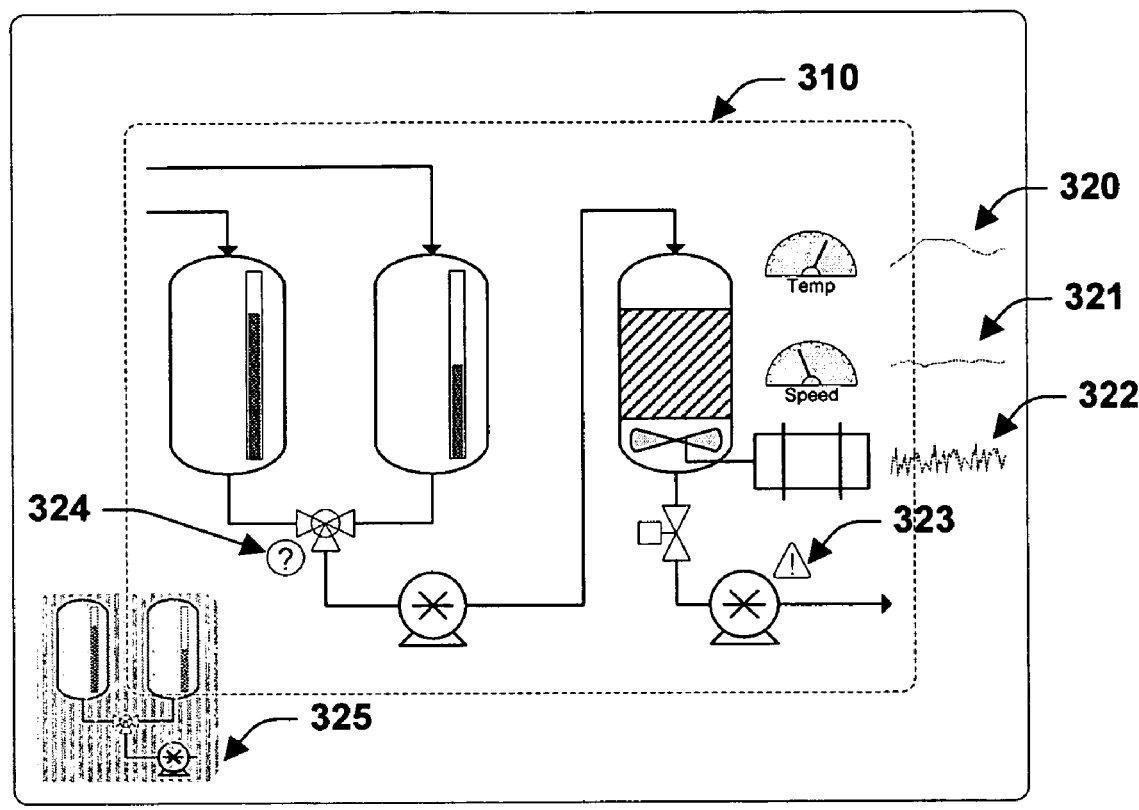
FIG. 3 is a diagram illustrating an example base presentation and overlay.

Turning to FIG. 3, an exemplary display 300 is depicted that display component 110 of FIG. 1 may render. It should be appreciated that display 300 (as well as display 400 of FIG. 4) is provided solely facilitate clarity and understanding with respect to various aspects of the subject disclosure and is therefore not meant to limit the subject invention in any manner. Display 300 includes a base presentation 310 comprising two tanks connected to a first valve and a first pump as well as a mixer, motor, a second value and a second pump. Base presentation 310 also includes two gages associated with the motor identifying motor temperature and speed. As shown, the base presentation 310 does not occupy they entire display rather it is centered in the middle providing a border of free space. In addition to base presentation 310, various items 320-325 are also displayed that provide related or situation specific information. Items 320 and 321 are graphs of historical information and item 322 provides information regarding vibration analysis with respect a motor. Item 323 indicates attention is required with respect to the associated pump and item 324 provides an indication that help information is available upon selection of the item, for instance. Item 325 is shrunken representation of details regarding the base presentation 310. Items 320, 321, 322, and 325 are superimposed on the display and are positioned along the periphery of the base presentation in accordance with an aspect of the invention. This positioning is beneficial at least because it does not obscure information provided by the base presentation 310. By contrast, items 323 and 324 are superimposed entirely over base presentation 310, but are small enough not to cover any objects provided thereby.

Figure 4:
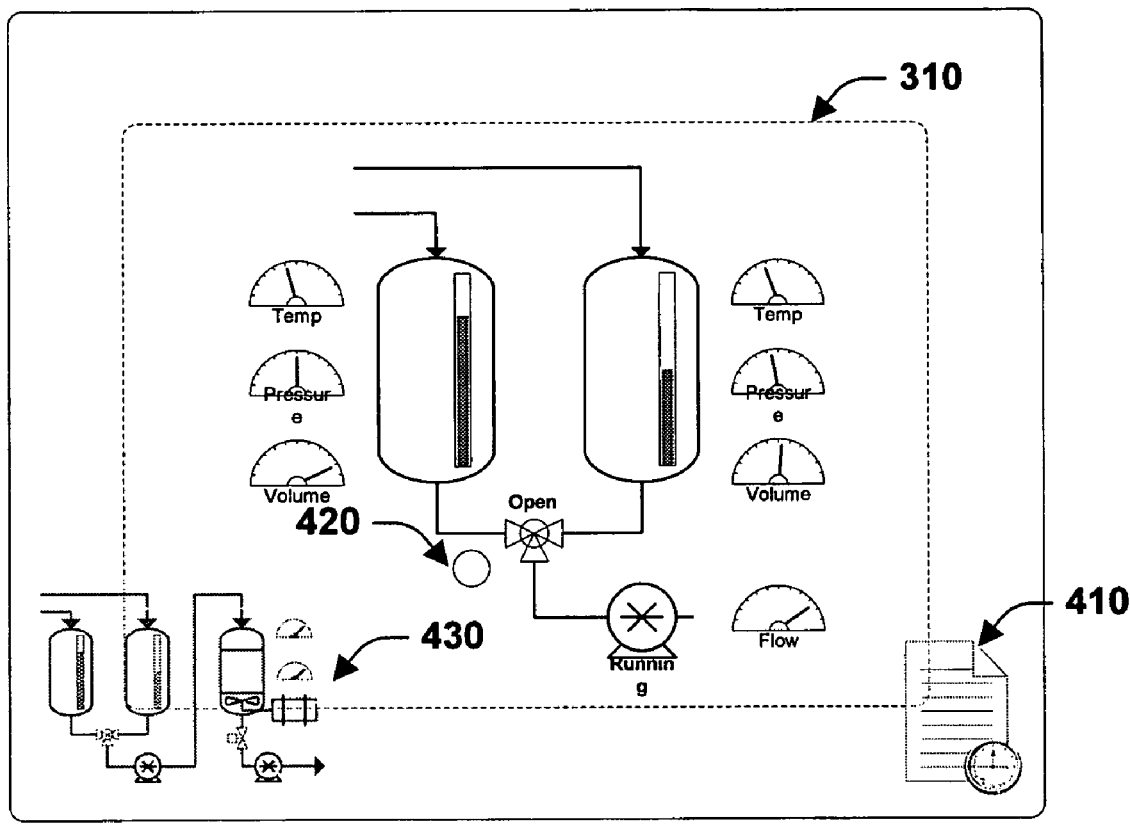
FIG. 4 is a diagram illustrating an alternative base presentation example and overlay.

A user can interact with any of the display objects which may cause the display to change. For instance, if a user selects or otherwise identifies item 325 the display 400 of FIG. 4 could result. As illustrated by FIG. 4, the interface system updates the base presentation 410 to show the selected information and automatically superimposes new, situation-specific information that is related to the updated display 400. In particular, items 410, 420 and 430 are displayed. Item 410 provides information regarding a shift production report and item 420 identifies that help is available for display upon selection, for example. Item 430 is a shrunken version of the previous base presentation 310 of FIG. 3. The user can return to the previous base presentation 310 by selecting superimposed item 430.

Figure 5:
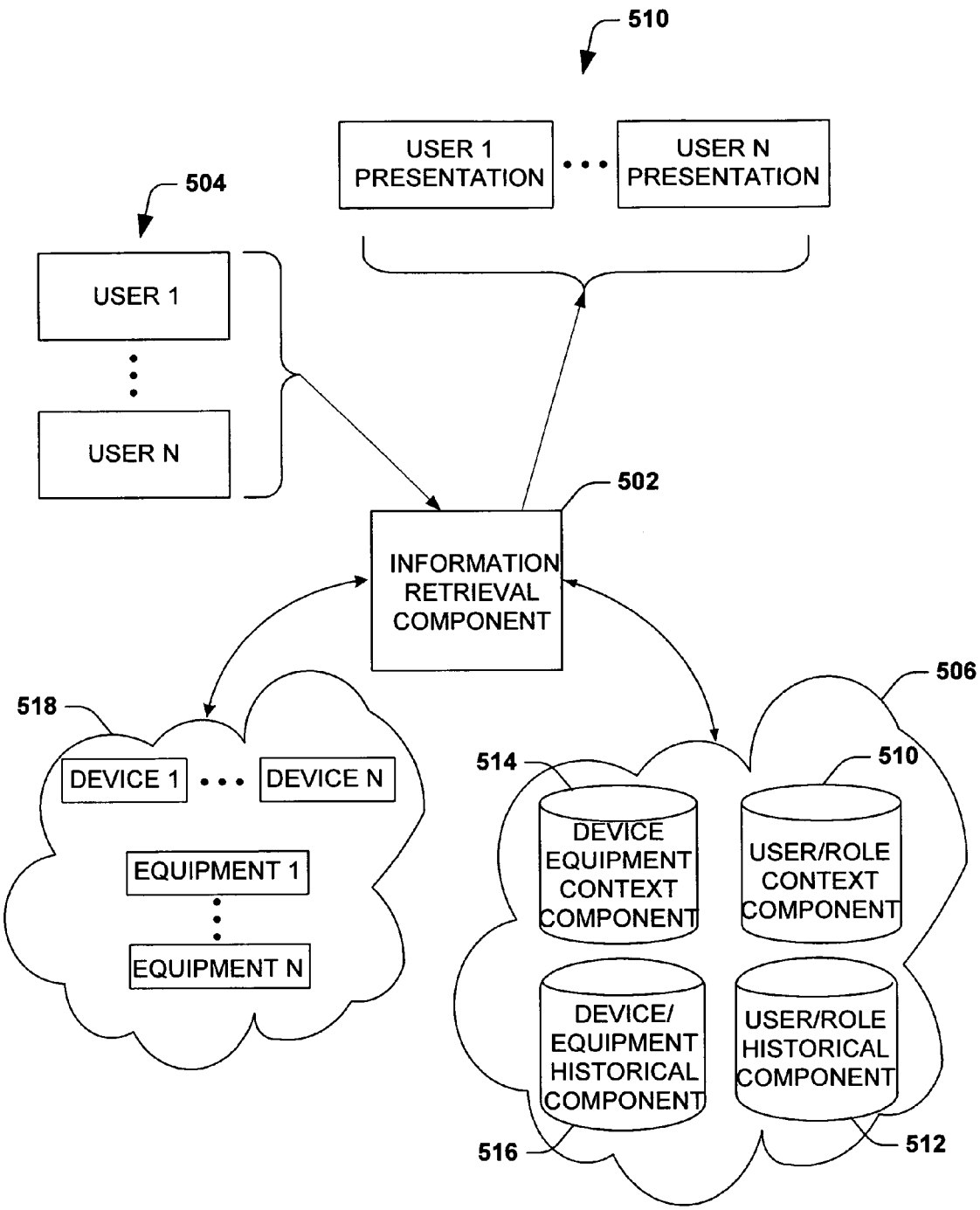
FIG. 5 is a diagram illustrating an example system for presenting information to a user based in part on context and location.

Referring now to FIG. 5, an example system 500 is illustrated for dynamically presenting information of interest to one or more users in an industrial automation environment. The system 500 includes an information retrieval component 502 that is configured to obtain information regarding user(s) of the system 500, historical and real-time information relating to the user(s), device(s) and/or equipment(s). The information retrieval component 502 can be further configured to make a determination or inference whether information should be presented to the user(s).

One or more users, illustrated at 504 as User 1 through User N, where N is an integer equal to or greater than one, can physically and/or virtually (e.g., remotely) interact with and/or navigate through system 500. As the user(s) 504 contacts the system 500, the information retrieval component 502 obtains, receives, requests, and so forth information regarding each user 504. A means for identifying each user 504 can be employed, such as a unique user name and/or password, for example. In other aspects, system 500 can use alternative identifications means, such as biometric authentication that utilizes physical characteristic unique to individuals. It is to be appreciated that a plurality of identification schemes can be utilized with system 500 and all such alterations and modifications are intended to fall within the scope of the detailed description and appended claims.

Utilizing the user identification, information retrieval component 502 can determine and/or track the context of each user 504. This information can be retrieved from one or more database or other storage/retrieval means that can include a user/role context data component 510 and/or a user/role historical data component 512. The context of each user can be, for example, the role, position, responsibilities, authorized programs, areas or regions of interest, activities, etc. as it relates to the particular user.

The information retrieval component 502 can further be configured to access historical data 506 from a device equipment context component 514 and/or a device/equipment historical component 516 that include data relating to device(s) and/or equipment. For example, information regarding the devices and/or equipment that are included in the automation control system can include a plurality of information that is maintained and/or stored. Examples of maintained information include logical and/or physical locations, operating status, other types of information that are of interest to different users and/or user roles. For example, an operator of the automation control system may have a direct area of interest than a tester and/or maintenance user because of the disparate role of each user and how/why each user interacts with system

500. The information retrieval component 502 is further configured to update the historical data 506.

The information retrieval component 502 can also be configured to interact with real-time data 518 regarding the device(s) and/or equipment associated with system 500. One or more device, labeled Device 1 through Device N, and/or one or more equipment, labeled Equipment 1 through Equipment N, where N is an integer can be monitored for status information. For example, real time data can include the operating status of the device/equipment (e.g., off, on, run, . . . ), the current stage or process of each device/equipment (e.g., operating, line of code being implemented, . . .).

The information retrieval component 502 can make a determination whether a user 504 would be interested in information relating to a particular device/equipment and is able to create mappings and/or linkages between the two sets of information (historical 506 and real time 518) and identify or infer information that may be relevant to users' current locations and activities. For example, if there is an alarm on a device and/or piece of equipment, based on the user context, the user may be presented information relating to such alarm condition. If the user context and/or historical information indicate that the user 502 is not interested in the particular device and/or equipment, the information retrieval component 504 will not present such information to the user. This determination can be made based on the user role, context, historical, and other information obtained as well as the device/equipment context, historical, current, and other information. If a determination is made that one or more user 504 would be interested in such information, the information is presented to the one or more user interested in the data, as shown at 510.

By way of example and not limitation, if an operator is working in the bottling area of a brewery, system 500 can automatically present that operator with information about the current operational status of the devices and/or equipment located in the area in which the operator is located. Similarly, if a maintenance engineer is currently working in the same area, the system 500 can present that user with information about the maintenance status of the devices and/or equipment located in that area at substantially the same time. In addition or alternatively, an electrician working in the same area might be presented with information about different devices and equipment, specifically, those related to the electrical systems in that area of the facility, at substantially the same time as the operator and maintenance engineer are presented information.

Figure 6:
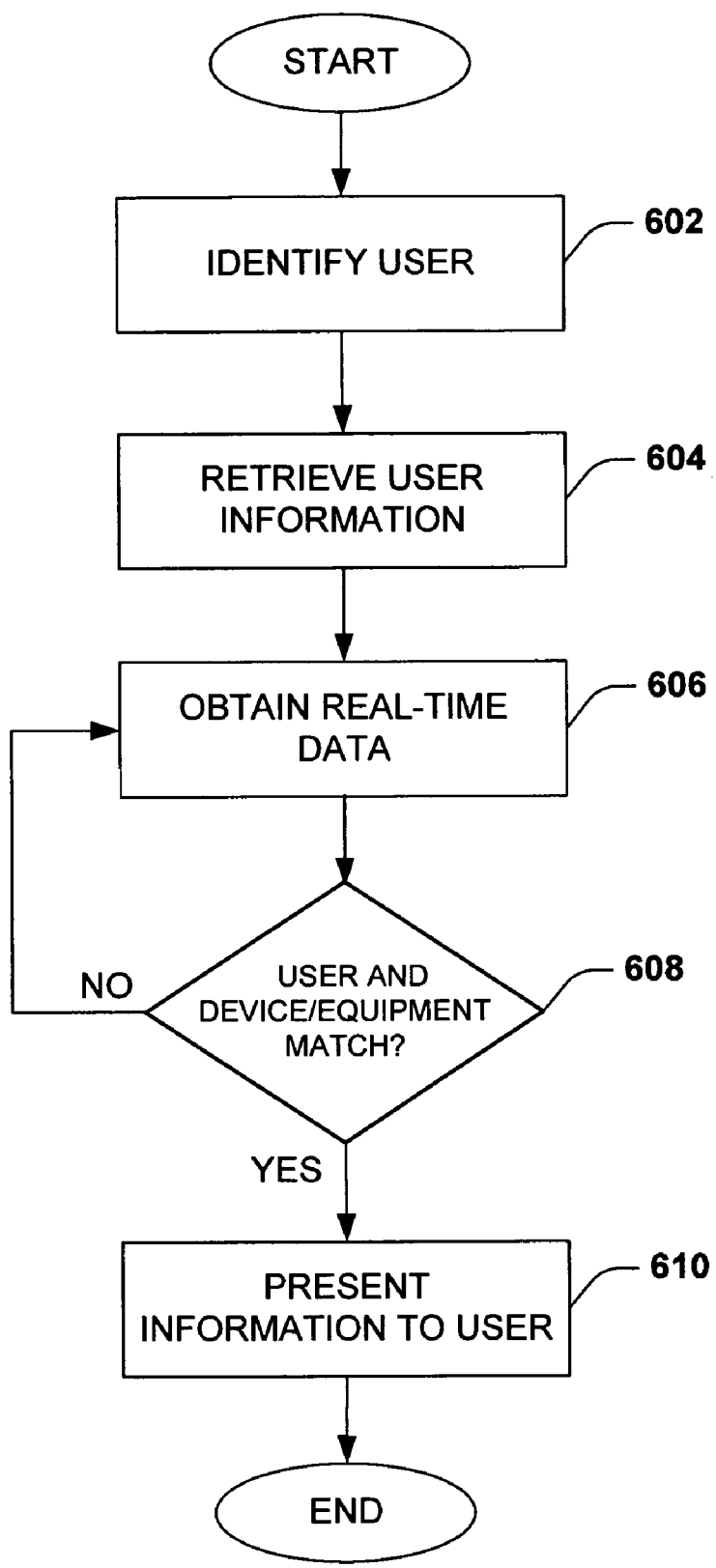
FIG. 6 is a flow diagram illustrating an interface process for presenting information to a user in view of context and/or location.

FIG. 6 illustrates a methodology 600 for presenting user(s) with information of interest. While, for purposes of simplicity of explanation, the methodology is shown and described as a series of acts, it is to be understood and appreciated that the methodology is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology as described herein.

The method 600 can identify the information of interest to one or more user without prompting or requesting such interest information from the user(s). The inference can be based on identity, role, location, and/or on text in a production facility by matching the user's location, context, and/or role with the location and/or status of device/equipment/system being monitored.

The process 600 begins at 602, where one or more users are identified. The identification of the user can be performed utilizing a plurality of identification techniques and the disclosed aspects are not limited to any one known technique. Based on the user identification, user information is retrieved, at 604, and can include contextual information and/or historical information. At 606, real-time data regarding the devices and/or equipment is obtained.

The method continues, at 608, where a determination is made whether a user interest matches the device and/or equipment information obtained. For example, based on a user's context and/or historical information a determination or inference can be made that the user would be interested in information regarding device/equipment in a particular area of an industrial setting. If the determination or inference is that the user would most likely be interested in the information ("YES"), the method continues, at 608, where the information is presented to the user(s). It should be understood that more than one user can receive substantially the identical information or different information at substantially the same time. If the determination, at 608, is that the user is most likely not interested in the information ("NO"), the method 600 continue at 606 where real-time data is monitored for information that might of interest to one or more users. It is to be understood that this act can be recursive such that any number of devices/equipment can be polled for information. Moreover, it is to be appreciated that automated and/or dynamic polling of device/equipment can be employed in connection with alternate aspects. For example, the system can be configured to automatically poll and/or report device/equipment information dynamically in accordance with inferring a user interest in such information. Before proceeding, it is noted that FIGS. 6-9 and the associated discussion are provided to add alternative role-based and HMI processing environments for the above described systems and methods.

Figure 7:
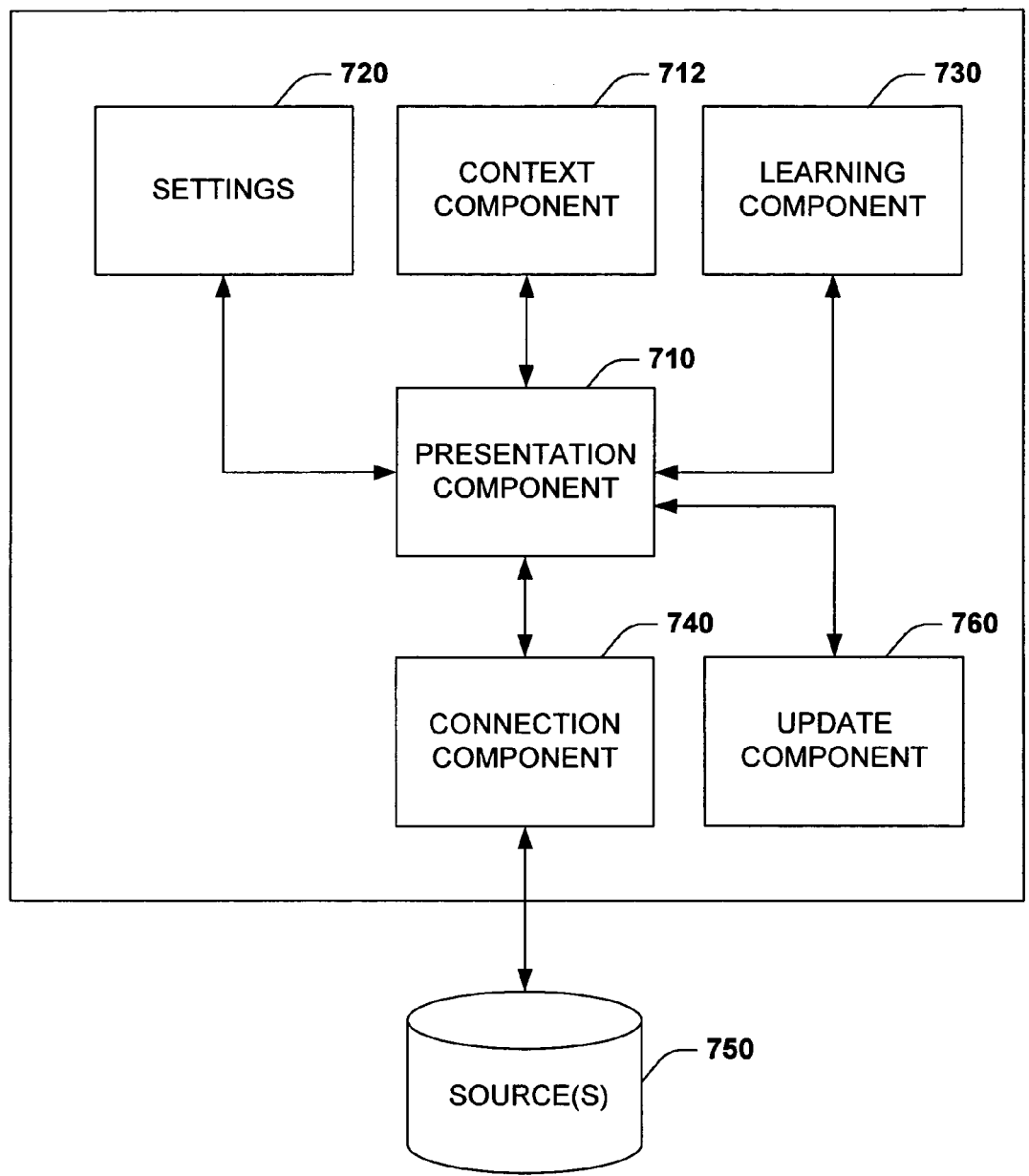
FIG. 7 is a diagram illustrating an alternative system for presenting industrial control information to a user.

Turning to FIG. 7, an alternative system 700 is provided for manipulating or processing user interface applications. The system 700 includes a presentation component 710 that produces and manages interaction with an element provided on a base display. The format of the element including the data to be supplied therewith can be influenced by settings 720 and context component 730. Additionally, connection component 740 is provided to set up connections to one or more sources 750 to supply data to the element. The system 700 can also include an update component 760. The update component 760 can monitor one or more sources and detect changes to particular data being utilized by the presentation component 710 for an element. Hence, the update component 760 can be communicatively coupled to the presentation component 710 and connection component 740. The update component 760 can receive, retrieve, or otherwise obtain the location and identity of data of interest from the presentation component 710 and can then monitor the particular source 750. If a change is detected, the update component 760 can inform the presentation component 710. Subsequently, the update component 760 can provide the presentation component 710 with the updated data or the presentation component can retrieve the data itself via the connection component 740. It should also be appreciated that this type of polling methodology can be executed by a source for example utilizing a serve-let, thereby eliminating the need for the update component 760 in certain instances.

Figure 8:
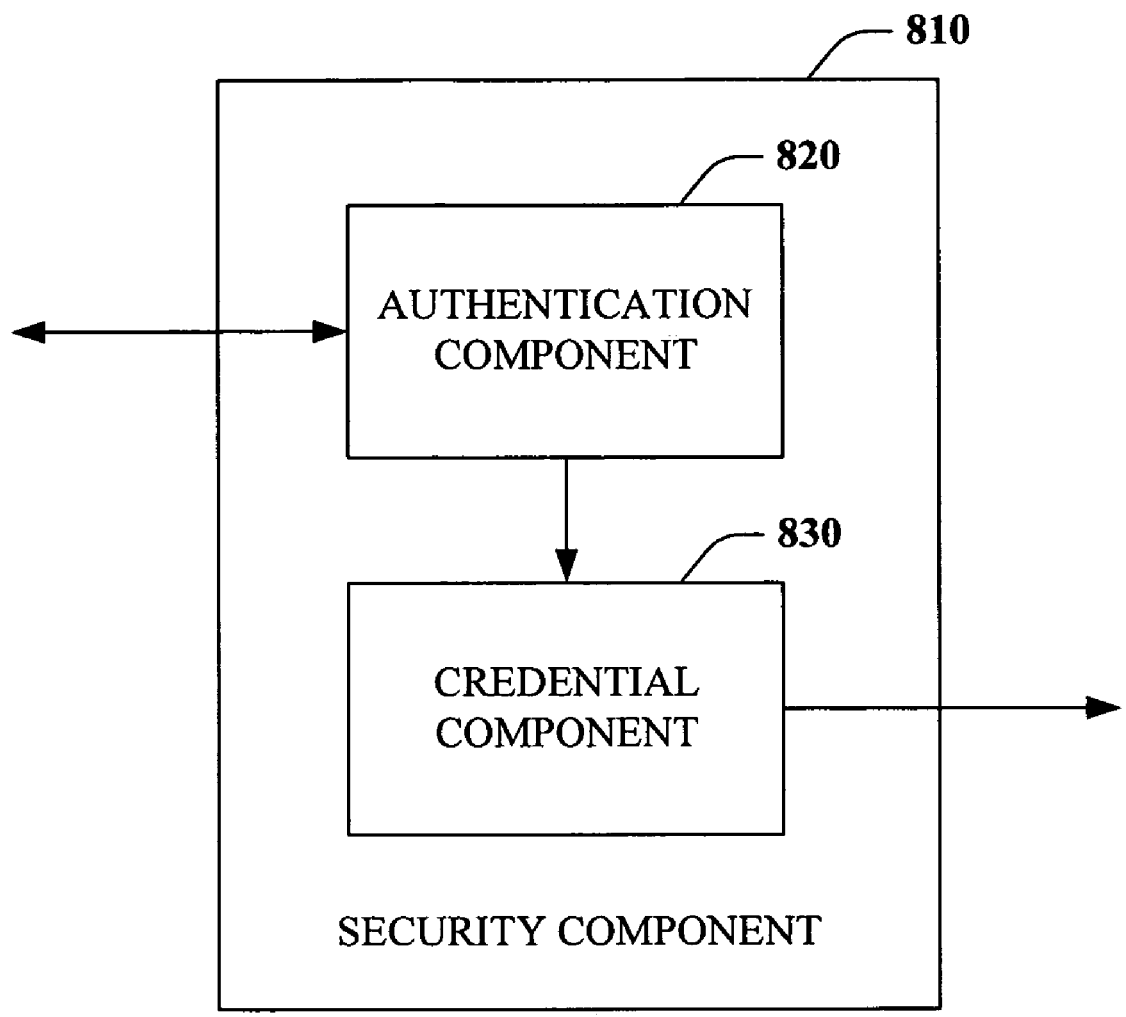
FIG. 8 is a diagram illustrating an example security component for identifying users and/or attributes.

FIG. 8. depicts a security component 810 that can be employed with the interfaces described herein. The security component 810 can include an authentication component 820 and a credential component 830. The authentication component 820 determines the identity of a user. For example, a user may be asked to furnish a user name and password. Authentication can also be accomplished by receiving a smart card to identify the user. Still further yet, the authentication component 820 can employ biometric authentication. Biometric authentication utilizes physical characteristic unique to individuals. For example, biometric authentication can include but is not limited to identifying a user via fingerprint, palm geometry, retina, facial features (e.g., 2-D, 3-D . . . ), signature, typing pattern (e.g., speed, rhythm . . . ), and/or voice recognition, among others. The authentication component 820 provides the credential component 830 with the identity of the user. The credential component 830 matches the user with particular credentials based on the individual user, group membership, or a position (e.g., administrator, manager . . . ), inter alia. The credentials specify the type, class and/or category of information that a user can obtain, or alternatively is prohibited from receiving.

Figure 9:
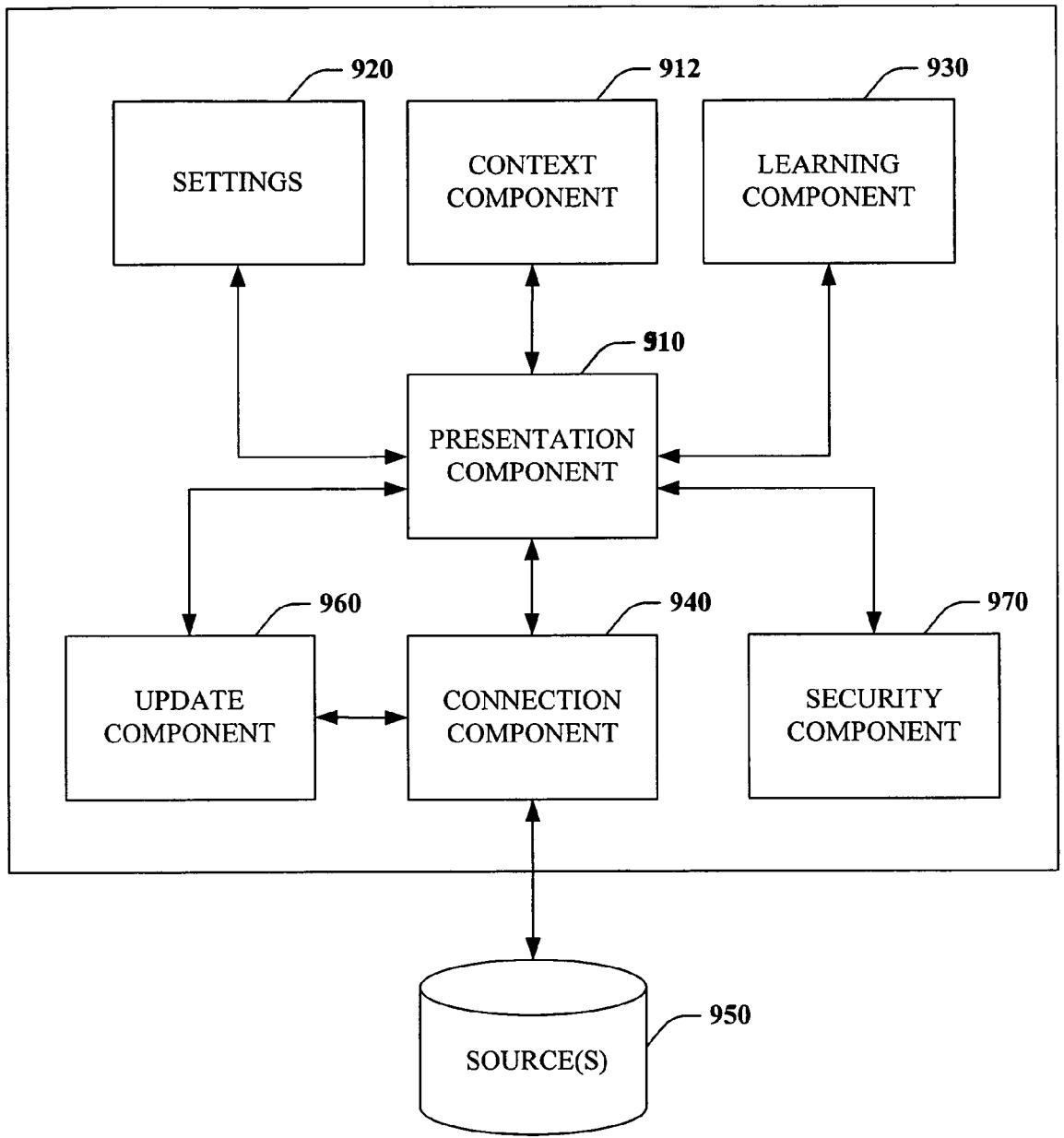
FIG. 9 is an alternative processing system for presenting industrial control information to users.

FIG. 9 illustrates an alternative system 900 for processing the interfaces described herein. Similar to FIG. 7, the system 900 can include a presentation component 910. The presentation component 910 can generate and control interaction with one or more elements added to a base presentation. Settings 920 and context component 930 can be utilized to influence the format as well as the data provided by an element. Connection component 940 is communicatively coupled to the presentation component 910 and one or more sources 950 and is operable to establish a connection between the presentation component 910 and one or more data sources 950. An update component 960 monitors one or more data sources via the connection component 940 to enable detection of data changes and facilitate notification of the presentation component thereof, inter alia. The system 900 also includes a security component 970. The security component 970 is communicatively coupled to presentation component 910 and facilitates control of data presented by elements. Accordingly, a mechanism is provided to ensure that at least some data is presented only to authorized or identified users. By way of example, the security component 970 can provide security credentials for a user to the presentation component 910. The presentation component 910 can then present only data that is appropriate for the security level of the user, an associated group or position. The identity of the user could come from outside the system 900 such as from computer or program login or the like. Alternatively, a component could request and receive information to enable a determination of a user's identity, for instance utilizing the security component 970. For example, a graphical component could request a username and password. Alternatively, a user may be asked to touch or gaze at the component to facilitate biometric identification.

It is noted that the interfaces described herein can include a Graphical User Interface (GUI) to interact with the various components for providing industrial control information to users. This can include substantially any type of application that sends, retrieves, processes, and/or manipulates factory input data, receives, displays, formats, and/or communicates output data, and/or facilitates operation of the enterprise. For example, such interfaces can also be associated with an engine, editor tool or web browser although other type applications can be utilized. The GUI can include a display having one or more display objects (not shown) including such aspects as configurable icons, buttons, sliders, input boxes, selection options, menus, tabs and so forth having multiple configurable dimensions, shapes, colors, text, data and sounds to facilitate operations with the interfaces. In addition, the GUI can also include a plurality of other inputs or controls for adjusting and configuring one or more aspects. This can include receiving user commands from a mouse, keyboard, speech input, web site, remote web service and/or other device such as a camera or video input to affect or modify operations of the GUI.

It is also noted that the term PLC as used herein can include functionality that can be shared across multiple components, systems, and or networks. One or more PLCs can communicate and cooperate with various network devices across a network. This can include substantially any type of control, communications module, computer, I/O device, Human Machine Interface (HMI)) that communicate via the network which includes control, automation, and/or public networks. The PLC can also communicate to and control various other devices such as Input/Output modules including Analog, Digital, Programmed/Intelligent I/O modules, other programmable controllers, communications modules, and the like. The network (not shown) can include public networks such as the Internet, Intranets, and automation networks such as Control and Information Protocol (CIP) networks including DeviceNet and ControlNet. Other networks include Ethernet, DH/DH+, Remote I/O, Fieldbus, Modbus, Profibus, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

What has been described above includes various exemplary aspects. It is, of course, not possible to describe every conceivable combination of components or methodologies for purposes of describing these aspects, but one of ordinary skill in the art may recognize that many further combinations and permutations are possible. Accordingly, the aspects described herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An industrial automation system, comprising:
   a context component to determine a user's identity, role, location (logical or physical), current activity, or previous interactions with automation devices;
   a device component that detects or determines context data pertaining to automation devices including control systems, devices and associated equipment;
   an information retrieval component that automatically determines information that a user is interested in, based at least in part on an analysis of context information associated with the user, the information is germane to a user's current location or activity based in part on a mapping between at least two sets of information;
   at least one base presentation component to display one or more elements of an industrial control environment to the user; and
   one or more display items that are dynamically superimposed on the base presentation component to provide industrial control information to the user, the one or more display items based at least in part on the automatically determined information.

2. The system of claim 1, further comprising a human machine interface (HMI), to facilitate viewing and interaction with base presentation component or the display items.

3. The system of claim 1, further comprising a display component that renders a display to or receives data from a display component including at least one of a monitor, a computer, a mobile device, and a web browser.

4. The system of claim 1, the display items are associated with alphanumeric characters, graphics, animations, audio or video data.

5. The system of claim 4, the data is static or updated dynamically to provide information in real-time as changes or events occur.

6. The system of claim 1, further comprising an interaction component that receives input concerning one or more display objects and information associated to the display objects.

7. The system of claim 6, the interaction component receives input from a user or system, where user input corresponds to object identification, selection or interaction with the interaction component.

8. The system of claim 6, further comprising at least one identification component for at least one user.

9. The system of claim 8, the identification component includes a mouse, a stylus, a trackball, a keyboard or keypad with respect to displayed information, a touch screen device such that identification can be made based on touching a graphical object, a gesture detection component, or a voice recognition component.

10. The system of claim 6, further comprising a component to generate a warning, an alarm, or a schedule.

11. The system of claim 1, the base presentation component generates, receives, retrieves or obtains a graphical representation of a production environment including one or more objects representing, devices or information pertaining to devices.

12. The system of claim 1, the display items provide information of interest and correspond to an icon, a thumbnail, a dialog box, a tool tip, or an object display.

13. The system of claim 12, the display items are transparent, translucent, or opaque and are of various sizes, color, brightness, or animated including fading in or fading out.

14. The system of claim 12, the icon is utilized to communicate a type of information being presented, where the thumbnail is employed to present an overview of information or essential content.

15. The system of claim 14, the thumbnail is a miniature but legible representation of information being presented and is statically or dynamically updated.

16. The system of claim 1, further comprising a component to adjust the data items to be viewed as larger or smaller displays, brighter or dimmer displays, opaque displays, or changing color displays to attract more or less of a user's attention, thereby indicating increasing or decreasing importance of displayed information.

17. The system of claim 16, further comprising adjusting positions of the data items to convey one or more of locations of equipment relative to a user's current location or view, the position or index of a current task within a sequence of tasks, or an ability to navigate forward or back to a previously visited presentation or view.

18. The system of claim 1, further comprising a selection component to enable a user to view and interact with data in fuller detail including presenting data that change from static to active updating upon selection.

19. The system of claim 1, further comprising a component to create mappings or linkages between at least two sets of information and identify information germane to a user's current location or activity.

20. A method to generate an industrial control interface comprising:

generating one or more base presentations for a given industrial control system contexts the industrial control environment context includes context data pertaining to automation devices including control systems, devices or associated equipment;

determining one or more users current context, the user context includes at least one of a user's identity, role, location (logical or physical), current activity, or previous interactions with automation devices;

automatically determining information that interests the one or more users based in part on an analysis of the one or more user's current context, the information germane to a user's current location or activity identified based in part on a mapping between at least two sets of information; and automatically adjusting display information to the one or more users based at least in part on the information that interests the one or more users.

21. The method of claim 20, further comprising automatically superimposing data on the base presentations.

22. The method of claim 21, the data appears inside or within proximity to the base presentation.

23. The method of claim 20, further comprising providing a selection component to select a superimposed data item associated with the base presentation.

24. The method of claim 23, the superimposed data includes historical data, machine data, warning data, attention data, help data, or production data.

25. A computer readable medium having a data structure stored thereon for an industrial control interface, comprising:

a first data field to specify an industrial control environment context, the industrial control environment context includes context data pertaining to automation devices including control systems, devices or associated equipment;

a second data field to specify a user context, the user context includes at least one of a user's identity, role, location (logical or physical), current activity, or previous interactions With automation devices; and a third data field to control display interface operations to automatically display information of interest to the user based in part on an analysis of the industrial control environment context and the user context, the information germane to a user's current location or activity identified based in part on a mapping between at least two sets of information.

26. The computer readable medium of claim 25, further comprising a field to control a size or an opaqueness of the display interface operations.

27. The computer readable medium of claim 25, the third data field includes an indication of a user's identity, role, location (logical or physical), current activity, or previous interactions with automation devices.

28. An industrial controller interface, comprising:

means for generating a base presentations of a factory;

means for determining a user current context, the user context includes at least one of a user's identity, role, location (logical or physical), current activity, or previous interactions with automation devices;

means for determining context data pertaining to automation devices including control systems, devices or associated equipment;

means for analyzing the user context;
means for automatically determining information that interests the user based in part on the analysis, the information germane to a user's current location or activity identified based in part on a mapping between at least two sets of information;

means for controlling a graphical user interface for the factory; and
means for automatically adjusting data items on the base presentation in view of the determined information.

* * * * *